United States Patent
Zhang et al.

(10) Patent No.: US 10,717,854 B2
(45) Date of Patent: Jul. 21, 2020

(54) SOLUTION POLYMERIZED STYRENE-BUTADIENE RUBBER-POLYURETHANE ELASTOMER MATERIAL FOR HIGH PERFORMANCE TIRE AND PREPARATION METHOD THEREOF

(71) Applicants: BEIJING UNIVERSITY OF CHEMICAL TECHNOLOGY, Beijing (CN); RED AVENUE NEW MATERIALS GROUP CO., LTD., Shanghai (CN)

(72) Inventors: Liqun Zhang, Beijing (CN); Xuan Qin, Beijing (CN); Bingyong Han, Beijing (CN); Lixin Mao, Beijing (CN); Xiaohui Wu, Beijing (CN); Jun Liu, Beijing (CN); Ning Zhang, Shanghai (CN); Dong Dong, Beijing (CN)

(73) Assignees: Beijing University of Chemical Tehcnology, Beijing (CN); Red Avenue New Materials Group Co., Ltd., Shanghai (CN)

( * ) Notice: Subject to any disclaimer, the term of this patent is extended or adjusted under 35 U.S.C. 154(b) by 52 days.

(21) Appl. No.: 16/197,073

(22) Filed: Nov. 20, 2018

(65) Prior Publication Data
US 2019/0112458 A1   Apr. 18, 2019

Related U.S. Application Data

(63) Continuation of application No. PCT/CN2016/090795, filed on Jul. 21, 2016.

(30) Foreign Application Priority Data

May 24, 2016  (CN) .......................... 2016 1 0348007

(51) Int. Cl.
| | | |
|---|---|---|
| C08G 18/69 | (2006.01) | |
| C08G 18/10 | (2006.01) | |
| C08L 9/06 | (2006.01) | |
| C08F 236/10 | (2006.01) | |
| C08G 18/76 | (2006.01) | |
| C08G 18/32 | (2006.01) | |
| C08G 18/62 | (2006.01) | |
| B60C 1/00 | (2006.01) | |
| C08F 212/08 | (2006.01) | |
| C08G 18/65 | (2006.01) | |
| C08F 2/14 | (2006.01) | |
| C08K 5/56 | (2006.01) | |
| C08L 75/04 | (2006.01) | |

(52) U.S. Cl.
CPC .................. *C08L 9/06* (2013.01); *B60C 1/00* (2013.01); *C08F 2/14* (2013.01); *C08F 212/08* (2013.01); *C08F 236/10* (2013.01); *C08G 18/10* (2013.01); *C08G 18/3206* (2013.01); *C08G 18/62* (2013.01); *C08G 18/6588* (2013.01); *C08G 18/69* (2013.01); *C08G 18/7621* (2013.01); *C08G 18/7671* (2013.01); *C08G 18/7678* (2013.01); *C08K 5/56* (2013.01); *C08L 75/04* (2013.01)

(58) Field of Classification Search
None
See application file for complete search history.

(56) References Cited

U.S. PATENT DOCUMENTS

| | | |
|---|---|---|
| 3,855,177 A | 12/1974 | Sanda |
| 7,999,036 B2 | 8/2011 | Nishioka |
| (Continued) | | |

FOREIGN PATENT DOCUMENTS

| | | |
|---|---|---|
| CN | 101113214 A | 1/2008 |
| CN | 103193954 A | 7/2013 |
| GB | 1436373 A | 5/1976 |
| (Continued) | | |

OTHER PUBLICATIONS

Varghese, Processability Characteristics of Hydroxy Terminated Polybutadienes; European Polymer Journal vol. 32 No. 1 (1996) pp. 79-83. (Year: 1996).*
International Search Report (including English translation) and Written Opinion issued in PCT/CN2016/090795, dated Jan. 11, 2017, 12 pages.
First Office Action issued in Chinese Application No. 201610348007.1 dated Aug. 30, 2019 with English concise explanation, (7p).
Extended European Search Report of EP Application No. 16902839. 6, dated Apr. 4, 2019 (5p).
(Continued)

*Primary Examiner* — David J Buttner
(74) *Attorney, Agent, or Firm* — Arch & Lake LLP (57) ABSTRACT

A solution polymerized styrene-butadiene rubber-polyurethane elastomer material and a preparation method thereof are provided. The elastomer material is prepared by performing cast molding on a soft segment and a hard segment in a mass ratio of 100:(20-50); the soft segment includes hydroxyl-terminated solution polymerized styrene-butadiene moiety rubber prepared by an anionic polymerization; the hard segment comprises isocyanate, a small-molecule polyol chain extender and a cross-linking agent; and the soft segment has a molecular weight of 1000-8000 and a glass-transition temperature of −20° C. to −30° C. According to the elastomer material in the disclosure, the hydroxyl-terminated solution polymerized styrene-butadiene rubber is introduced to serve as the soft segment on the basis of synthesis of the traditional polyurethane elastomer, so that the glass-transition temperature of the polyurethane elastomer is regulated, defects such as poor high temperature resistance and undesirable wet-skid resistant grip ability of an existing polyurethane tire are overcome.

17 Claims, 2 Drawing Sheets

(56) References Cited

U.S. PATENT DOCUMENTS

2008/0027176 A1  1/2008 Nishioka
2011/0251348 A1  10/2011 Kloppenburg et al.

FOREIGN PATENT DOCUMENTS

| GB | 1437007 A | | 5/1976 |
|---|---|---|---|
| JP | 57159812 A | | 10/1982 |
| JP | 57212223 | * | 12/1982 |
| JP | 2010536946 A | | 12/2010 |
| WO | 0049085 A1 | | 8/2000 |
| WO | 2007025690 A1 | | 3/2007 |
| WO | 2009021917 A1 | | 2/2009 |

OTHER PUBLICATIONS

Japanese Office Action issued in Japanese Patent Application No. 2019-514157 dated Oct. 23, 2019 with English translation, (6p).
Han Bingyong et al., "Synthesis and characterization of dilithium oligomer of isoprene" Communications China Synthetic Rubber Industry, Beijing, China, May 15, 2003, (1p).

* cited by examiner

SOLUTION POLYMERIZED STYRENE-BUTADIENE RUBBER-POLYURETHANE ELASTOMER MATERIAL FOR HIGH PERFORMANCE TIRE AND PREPARATION METHOD THEREOF

CROSS-REFERENCE TO RELATED APPLICATIONS

This application is based upon and claims the priority of PCT patent application No. PCT/CN2016/090795 filed on Jul. 21, 2016 which claims the priority of Chinese Patent Application No. 201610348007.1 filed on May 24, 2016, the entire contents of which are hereby incorporated by reference herein.

TECHNICAL FIELD

The present disclosure relates to the field of polymer synthesis, and more particularly relates to a solution polymerized styrene-butadiene rubber-polyurethane elastomer material for a high performance tire and a preparation method thereof.

BACKGROUND

Tire industry not only boasts its long history but also writes modern civilization. Since disclosure of pneumatic tires in 1855, the tire manufacturing technology at present has been constantly improved after several technical and theoretical changes. Tire products are widely applied to fields such as transportation. With rapid development of the automobile industry and expressway, the tire has become one of the polymer products enjoying the highest yield and most advanced technological level. However, social development and environment problems such as increasingly serious energy consumption, an increase of accidents, lots of solid tire wastes caused by short service life put forward high requirement on tire. Correlations between energy consumption and rolling resistance, between safety and wet-skid resistance and between service life and wear resistance have formed a "Devil's Triangle", and the balance of the three correlations cannot be achieved under existing materials and process conditions. Therefore, the development of a novel material is imperative.

Unlike plastics with high degree of crystallinity and high glass transition temperature, rubber materials feature large free volume, small intermolecular force, low glass transition temperature and amorphous high-elastic state. Therefore, most of the rubber materials cannot be applied before filler reinforcing. Carbon black serving as the traditional reinforcing filler was applied more than 100 years ago. Due to its original nano-size, the carbon black can obviously increase physical and mechanical properties, wear resistance and fatigue resistance of the rubber materials, however, main strong physical interaction exists between the carbon black and the rubber; therefore, in spite of advantages such as good nano-reinforcing effect and high wear resistance of the tire, it causes high material dynamic loss and thermogenesis, as well as high tire oil consumption due to the frictions between carbon black particles and rubber molecules as well as between the carbon black particles. Carbon black is well known for its use in preparation of "green tires" because of a large amount of silicon hydroxyl existing on the surface of the white carbon black, brings a good chemical surface modification, can form strong chemical bonds with the rubber and contributes to obvious reduction in rolling resistance of the prepared tire. However, due to small nanoparticle size of the white carbon black, low apparent density of aggregate, and high viscosity of the rubber, the white carbon black is difficultly mixed and is easy to fly, and causes high mixing energy consumption. Meanwhile, organic modification of the silicon hydroxyl of the white carbon black may be performed only after a certain time of high-temperature (140-160° C.) mixing, a modification effect cannot be achieved when a temperature is too low, and a rubber polymer chain may be thermally degraded when the temperature is too high. Therefore, the process has extremely high requirements on performance parameters of processing equipment, processing cost is high, and the tire prepared from the white carbon black has poor wear resistance. The abovementioned reasons hinder its large-scale application.

Compared with the traditional rubber material, a polyurethane elastomer material has the characteristics of excellent wear resistance, high tearing strength and elongation, wide hardness range, low rolling resistance, extremely high load capacity and good vibration absorption and shock absorption effects. Particularly, a casting polyurethane elastomer is the most wear-resistant elastomer at present, has advantages of high wear resistance, colorability, high cutting resistance and excellent oil resistance and chemical resistance, does not need to be added with carbon black or aromatic hydrocarbon oil and becomes an ideal material for manufacturing high-performance tire. The tire made from the polyurethane material boasts its simple process, safety, durability and eco-friendly performance, and can be recycled or used for manufacturing other industrial products once scraped, and its cost is much lower than that of the traditional rubber tire. Therefore, the polyurethane tire is well received by consumers and becomes a focus of the industry.

However, at present, there is a need for solving technical problems in production of the polyurethane tires such as poor high temperature resistance and undesirable wet-skid resistant grip ability.

SUMMARY

In order to solve problems arising in the prior art, the present disclosure provides a solution polymerized styrene-butadiene rubber-polyurethane elastomer material for a high-performance tire and a preparation method thereof. According to the elastomer material of the present disclosure, hydroxyl-terminated solution polymerized styrene-butadiene rubber is introduced to serve as a soft segment on the basis of synthesis of the traditional polyurethane elastomer, on the basis of maintaining its advantages of the polyurethane elastomer material such as eco-friendly performance, high wear resistance, oil resistance, chemical resistance and low rolling resistance and by combining excellent flexing resistance and excellent dynamic mechanical property of the solution polymerized styrene-butadiene rubber, the glass transition temperature of the polyurethane elastomer is regulated, defects such as poor high temperature resistance and undesirable wet-skid resistant grip ability of an existing polyurethane tire are overcome, and the prepared tire has excellent comprehensive application property. Tires prepared by the polyurethane material of the present disclosure are bound to have wide development space in a future tire industry.

One purpose of the present disclosure is to provide a solution polymerized styrene-butadiene rubber-polyurethane elastomer material for a high performance tire.

The elastomer material is prepared by performing cast molding on:

a soft segment and a hard segment having a mass ratio of 100:(20-50); preferably 100:(30-45);

the soft segment includes hydroxyl-terminated solution polymerized styrene-butadiene rubber moiety prepared by an anionic polymerization;

the hard segment comprises isocyanate, a small-molecule polyol chain extender and a cross-linking agent;

the isocyanate is 4,4-diphenylmethane diisocyanate or 1,5-naphalene diisocyanate or toluene-2,4-diisocyanate; and preferably 1,5-naphalene diisocyanate;

the small-molecule polyol chain extender is 1,4-butanediol or ethylene glycol; and preferably 1,4-butanediol;

the cross-linking agent is trimethylolpropane or glycerin;

a mass ratio of the soft segment to the isocyanate is 100:(15-45);

a mass ratio of (the soft segment+the isocyanate) to (the chain extender+the cross-linking agent) is 100:(4-12);

a mass ratio of the chain extender to the cross-linking agent is 100:(15-50);

the soft segment has a molecular weight of 1000-8000; preferably 4500-6500; and the soft segment has a glass transition temperature of −20° C. −30° C.

The solution polymerized styrene-butadiene rubber-polyurethane elastomer has a glass transition temperature of −20° C. to −30° C.

The soft segment is prepared by a method comprising the following steps:

(1) preparation of a dilithium initiator, namely taking cyclohexane and tetrahydrofuran as solvents, and reacting isoprene and lithium metal under an ice-water bath condition to produce the dilithium initiator;

(2) distillation and purification of ethylene oxide; and (3) performing a synthetic reaction on butadiene, styrene and the dilithium initiator at a reaction temperature of 45-55° C. for 3.5-4.5 h, cooling a reactor to a room temperature, adding ethylene oxide to serve as an end-capping reagent, and reacting for 12-14 h to obtain hydroxyl-terminated solution polymerized styrene-butadiene rubber;

wherein, a mass ratio of butadiene to styrene is 100:(25-35);

a mass ratio of ethylene oxide to active lithium is 100:(10-20); and a mass ratio of the active lithium to (butadiene+styrene) is 1:(90-790).

The dilithium initiator has a concentration of preferably 0.5-1.0 mol/L.

A second purpose of the present disclosure is to provide a preparation method of a solution polymerized styrene-butadiene rubber-polyurethane elastomer material for a high performance tire.

The preparation method comprises:

a, preparation of a prepolymer, namely stirring hydroxyl-terminated solution polymerized styrene-butadiene rubber at 90-100° C. under vacuum condition for 2-3 h, cooling to 80-90° C., adding isocyanate, reacting for 2.5-3 h, cooling to 65-75° C., sampling, detecting mass content of —NCO, supplementing the isocyanate when the mass content of —NCO is less than 5%-11%, and discharging when the mass content of —NCO reaches 5%-11%; and b, preparation of a solution polymerized styrene-butadiene rubber-polyurethane elastomer, namely stirring the prepolymer at 80-90° C. under vacuum condition for 2-3 h, cooling to 65-75° C., adding a small-molecule polyol chain extender and a cross-linking agent, stirring at a high speed for 2-3 min, and performing cast molding to prepare the polyurethane elastomer material.

Preferably, the stirring rate is 150-250 rad/min, the high-speed stirring rate is 400-600 rad/min;

and a dropping rate of the small-molecule polyol chain extender and the cross-linking agent is 1-2 s/drop.

The present disclosure may specifically adopt the following technical solutions:

1) preparation of the dilithium initiator: a preparation method in the prior art can be adopted, the cyclohexane and tetrahydrofuran are matched to serve as the solvent, and the isoprene and lithium metal are reacted under the ice-water bath condition to produce the dilithium initiator. Preferably, the concentration of the initiator is 0.5-1.0 mol/L, the mass ratio of the tetrahydrofuran to the active lithium is 100:(5-8), a volume ratio of the tetrahydrofuran to cyclohexane is about 1:1, a mass ratio of the active lithium to the isoprene is 100:(10-30); and in order to enable the lithium metal and the isoprene to be completely reacted, an amount of the added lithium is 5 times that of a theoretical value; and a volume ratio of the cyclohexane to the tetrahydrofuran is 1:1. The preparation comprises steps: adding a lithium sheet of which an oxide layer was stripped and tetrahydrofuran into a three-neck flask, placing it in an ice-water bath under argon shielding, and stabilizing the temperature at about 0° C.; uniformly mixing the isoprene and cyclohexane, adding the mixture into a pressure-equalizing dropping funnel, slowly adding into the three-neck flask drop by drop, and fully reacting with the lithium metal; continuously stirring at 0° C. for 6-8 h after dropping; placing in a low temperature for 22-26 h after the reaction; and filtering the upper clarified reaction solution by using a G4 sand core funnel to obtain a brownish red transparent initiator solution. Before use, the initiator concentration by a double titration method;

2) distillation of ethylene oxide: serving the ethylene oxide as an end-capping reagent, and impurities, water and the like contained in the ethylene oxide could enable the active lithium ion to lose activity so as to cause chain termination, thereby influencing active chain end modification. In order to improve the purity, an appropriate amount of calcium hydride is ground into powder, the powder is added into the ethylene oxide to be soaked for 24-26 h, and the ethylene oxide is distilled off at a normal temperature under a nitrogen atmosphere;

3) preparation of hydroxyl-terminated solution polymerized styrene-butadiene rubber: raising a temperature of a reactor to 45-55° C., and washing the reactor with cyclohexane for 1.5-2.5 h, wherein a mass ratio of butadiene to styrene is 100:(25-35), a monomer mass fraction is 10%, a reaction temperature during butadiene-styrene rubber synthesis is 50° C., and the reaction time is 3.5-4.5 h; cooling the reactor to a room temperature, and adding the ethylene oxide to serve as the end-capping reagent, wherein a mass ratio of the ethylene oxide to active lithium is 100:20, and the reaction time is 12-14 h; collecting the rubber solution in the nitrogen atmosphere, adding an appropriate amount of hydrochloric acid, stirring at a normal temperature for 4-6 h, precipitating with absolute ethanol to obtain the hydroxyl-terminated solution polymerized styrene-butadiene rubber, sealing and preserving;

4) preparation of a prepolymer: stirring the hydroxyl-terminated solution polymerized styrene-butadiene rubber at 90-100° C. under vacuum condition for 2.5 h, cooling to 80-90° C., adding isocyanate, reacting for 2.5-3 h, cooling to 65-75° C., sampling, detecting mass content of —NCO according to a standard ASTM D2572-9, supplementing the isocyanate when the mass content of —NCO is less than 5%-11%, discharging when the mass content of —NCO reaches 5%-11%, sealing and preserving;

5) preparation of solution polymerized styrene-butadiene rubber-polyurethane elastomer: stirring the prepolymer at 80-90° C. under vacuum condition for 2 h, cooling to 65-75° C., adding a small-molecule polyol chain extender and a cross-linking agent, stirring at a high speed for 2-3 min, performing cast molding, curing in a drying oven at 100° C., demolding, and placing in a normal temperature for 7 d.

Preferably, in the step 3), the mass ratio of the butadiene to styrene is 100:30.

Preferably, in the step 4), the stirring rate is 200 rad/min.

Preferably, in the step 5), the stirring rate is 200 rad/min, the high-speed stirring rate is 500 rad/min, and the dropping rate of the small-molecule polyol chain extender and the cross-linking agent is 1-2 s/drop.

The glass transition temperature of the polyurethane elastomer has a great influence on dynamic mechanical property thereof. There is a strong correlation between the glass transition temperature of the polyurethane elastomer and the glass transition temperature of the soft segment. According to the present disclosure, the glass transition temperature of the soft segment is regulated by adjusting content of styrene and 1,2-butadiene. Therefore, the glass transition temperature of the solution polymerized styrene-butadiene rubber-polyurethane elastomer of the present disclosure is −20° C. to −30° C., and dynamic mechanical test on the elastomer shows that the elastomer has a high loss factor (tan δ) at a lower temperature (about 0° C.). This characteristic can improve wet-skid resistance of the product, and help to accord with a use standard of the green tire.

The present disclosure has beneficial effects as follows:

1) according to the present disclosure, the hydroxyl-terminated solution polymerized styrene-butadiene rubber is introduced to serve as the soft segment on the basis of synthesis of the traditional polyurethane elastomer, on the basis of maintaining its advantages of the polyurethane elastomer material such as eco-friendly performance, high wear resistance, oil resistance, chemical resistance and low rolling resistance, and by combining with excellent flexing resistance and excellent dynamic mechanical property of the solution polymerized styrene-butadiene rubber, the glass transition temperature of the polyurethane elastomer is regulated, and the comprehensive application property is improved; and 2) the tire prepared by the polyurethane elastomer material of the present disclosure overcomes the defects such as poor high temperature resistance and undesirable wet-skid resistant grip ability of an existing polyurethane tire, and lays a foundation for implementation of industrial application in foreseeable future.

The foregoing is only the brief description of the technical proposals of the present disclosure. For more clearly understanding the technical proposals of the present disclosure which can be implemented, and for more apparently and easily understanding the above and other objectives, characteristics and advantages of the present disclosure, specific examples of the present disclosure are given below.

BRIEF DESCRIPTION OF THE DRAWINGS

For more clearly understanding the technical proposals in the examples of the present disclosure or the prior art, simple description will be given below to the accompanying drawings required to be used in the description of the examples or the prior art. Apparently, the accompanying drawings described below are only some examples recorded in the present disclosure. Other accompanying drawings may also be obtained by one of ordinary skill in the art without creative efforts on the basis of the accompanying drawings.

DETAILED DESCRIPTION

For better understanding of the technical proposals in the present disclosure, technical proposals of the examples will be described in a clearly and fully understandable way in connection with the drawings in the examples of the disclosure. It is apparent that the described examples are just a part but not all of the examples of the disclosure. Based on the described examples herein, one of ordinary skill in the art can obtain other example(s), without any creative work, which shall be within the scope of the disclosure.

The present disclosure is further illustrated below in conjunction with the examples.

Raw materials used in the examples are all commercially available;

A glass transition temperature is measured by a differential scanning calorimeter of Switzerland company METTLER TOLEDO.

EXAMPLE 1

A preparation process of a polyurethane elastomer in the example comprises:

1) preparation of a dilithium initiator: cyclohexane and tetrahydrofuran were matched to serve as a solvent, and isoprene was reacted with lithium metal under an ice-water bath condition to produce the dilithium initiator; 70 g of a lithium sheet of which an oxide layer was stripped and 500 ml of tetrahydrofuran were added into a three-neck flask, then the three-neck flask was put in the ice-water bath under argon shielding, and the temperature was stabilized at about 0° C.; 200 ml of isoprene and 500 ml of cyclohexane were uniformly mixed and added into a pressure-equalizing dropping funnel, the mixture was slowly added into the three-neck flask drop by drop, and reacted with the lithium metal; the mixture was continuously stirred at 0° C. for 6 h after dropping; the mixture was placed in a low temperature for 24 h after the reaction; and the upper clarified reaction solution was filtered by a G4 sand core funnel to obtain a brownish red transparent initiator solution. Before use, the initiator concentration was calibrated by a double titration method. The concentration of the dilithium initiator was 0.8 mol/L;

2) distillation of ethylene oxide: 10 g of calcium hydride was ground into powder, the powder was added into 100 ml of ethylene oxide and was soaked for 24 h, and the ethylene oxide was distilled off at a normal temperature in a nitrogen atmosphere;

3) preparation of the hydroxyl-terminated solution polymerized styrene-butadiene rubber: a temperature of a reactor was raised to 50° C., and the reactor was washed with cyclohexane for 2 h, wherein a mass ratio of butadiene to styrene was 100:25, a monomer mass fraction was 10%, a mass ratio of active lithium to (butadiene+styrene) was 1:280, a reaction temperature during butadiene-styrene rubber synthesis was 50° C., and the reaction time was 4 h; the reactor was cooled to a room temperature, and the ethylene oxide was added to serve as the end-capping reagent, wherein a mass ratio of the ethylene oxide to active lithium was 100:18, and the reaction time was 12 h; the rubber solution was collected in the nitrogen atmosphere, an appropriate amount of hydrochloric acid was added, the mixture was stirred at a normal temperature for 4 h, precipitation was performed by using absolute ethanol to obtain the hydroxyl-terminated solution polymerized styrene-butadiene rubber (having a molecular weight of 3000 and a glass transition temperature of −25.9° C.), the product was sealed and preserved;

4) preparation of a prepolymer: 16 g of hydroxyl-terminated solution polymerized styrene-butadiene rubber was stirred at 95° C. under vacuum condition (at a stirring rate of 150 rad/min) for 2.5 h, the temperature was lowered to 80° C., 4.35 g of 4,4-diphenylmethane diisocyanate (MDI) was added, the mixture reacted for 3 h, the temperature was lowered to 65° C., sampling was performed, the mass content of —NCO was detected according to standard ASTM D2572-97, and when the mass content of —NCO reached 7%, the produce was discharged, sealed and preserved; and 5) preparation of the solution polymerized styrene-butadiene rubber-polyurethane elastomer: 20.3 g of the prepolymer was stirred at 80° C. under vacuum condition (at a stirring rate of 150 rad/min) for 2 h, the temperature was lowered to 65° C., 0.92 g of 1,4-butanediol (BDO) and 0.16 g of trimethylolpropane (TMP) were added (at a dropping rate of 1 s/drop), the mixture was stirred at high speed (at a stirring rate of 400 rad/min) for 3 min, cast molding was performed, the mold was put in a drying oven at 100° C. for curing for 20 h, and the product was placed at a normal temperature for 7 d after being demoulded.

EXAMPLE 2

A preparation process of a polyurethane elastomer in the example comprises:

1) preparation of a dilithium initiator: cyclohexane and tetrahydrofuran were matched to serve as a solvent, and isoprene and lithium metal were reacted under an ice-water bath condition to produce the dilithium initiator; 60 g of a lithium sheet of which an oxide layer was stripped and 500 ml of tetrahydrofuran were added into a three-neck flask, then the three-neck flask was placed in the ice-water bath under argon shielding, and the temperature was stabilized at about 0° C.; 200 ml of isoprene and 500 ml of cyclohexane were uniformly mixed, the mixture was added into a pressure-equalizing dropping funnel, was slowly added into the three-neck flask drop by drop, and fully reacted with the lithium metal; the mixture was continuously stirred at 0° C. for 6 h after dropping; the mixture was placed in a low temperature for 24 h after the reaction; and the upper clarified reaction solution was filtered by using a G4 sand core funnel to obtain a brownish red transparent initiator solution. Before use, the initiator concentration was calibrated by a double titration method. The concentration of the dilithium initiator was 0.8 mol/L;

2) distillation of ethylene oxide: 10 g of calcium hydride was ground into powder, the powder was added into 100 ml of ethylene oxide and was soaked for 24 h, and the ethylene oxide was distilled off at a normal temperature in a nitrogen atmosphere;

3) preparation of hydroxyl-terminated solution polymerized styrene-butadiene rubber: the temperature of a reactor was raised to 50° C., and the reactor was washed with cyclohexane for 2 h, wherein a mass ratio of butadiene to styrene was 100:25, a monomer mass fraction was 10%, a mass ratio of active lithium to (butadiene+styrene) was 1:430, a reaction temperature during butadiene-styrene rubber synthesis was 50° C., and the reaction time was 4 h; the reactor was cooled to a room temperature, and the ethylene oxide was added to serve as the end-capping reagent, wherein a mass ratio of the ethylene oxide to active lithium was 100:20, and the reaction time was 12 h; the rubber solution was collected in the nitrogen atmosphere, an appropriate amount of hydrochloric acid was added, the mixture was stirred at a normal temperature for 4 h, precipitation was performed with absolute ethanol to obtain the hydroxyl-terminated solution polymerized styrene-butadiene rubber (having a molecular weight of 4500 and a glass transition temperature of −28.5° C.), and the product was sealed and preserved;

4) preparation of a prepolymer: 16 g of hydroxyl-terminated solution polymerized styrene-butadiene rubber was stirred at 95° C. under vacuum condition (at a stirring rate of 200 rad/min) for 2.5 h, the temperature was lowered to 90° C., 4.58 g of 1,5-naphalene diisocyanate (NDI) was added, the mixture reacted for 3 h, the temperature was lowered to 65° C., sampling was performed, the mass content of —NCO was detected according to standard ASTM D2572-97, and when the mass content of —NCO reached 7%, the product was discharged, sealed and preserved; and 5) preparation of solution polymerized styrene-butadiene rubber-polyurethane elastomer: 20.5 g of the prepolymer was stirred at 90° C. under vacuum condition (at a stirring rate of 200 rad/min) for 2 h, the temperature was lowered to 65° C., 0.95 g of 1,4-butanediol (BDO) and 0.95 g of trimethylolpropane (TMP) were added (at a dropping rate of 2 s/drop), the mixture was stirred at a high speed (at a stirring rate of 500 rad/min) for 2 min, cast molding was performed, the mold was put in a drying oven at 100° C. for curing for 20 h, and the product was placed at a normal temperature for 7 d after being demoulded.

EXAMPLE 3

A preparation process of a polyurethane elastomer in the example comprises:

1) preparation of a dilithium initiator: cyclohexane and tetrahydrofuran were matched to serve as a solvent, and isoprene and lithium metal were reacted under an ice-water bath condition to produce the dilithium initiator; 90 g of a lithium sheet of which an oxide layer was stripped and 500 ml of tetrahydrofuran were added into a three-neck flask, then the three-neck flask was placed in the ice-water bath under argon shielding, and the temperature was stabilized at about 0° C.; 200 ml of isoprene and 500 ml of cyclohexane were uniformly mixed, and the mixture was added into a pressure-equalizing dropping funnel, and then slowly added into the three-neck flask drop by drop, and fully reacted with the lithium metal; the mixture was continuously stirred at 0° C. for 6 h after dropping; the mixture was placed in a low temperature for 24 h after the reaction; and the upper clarified reaction solution was filtered by using a G4 sand core funnel to obtain a brownish red transparent initiator solution. Before use, the initiator concentration was calibrated by a double titration method. The concentration of the dilithium initiator was 0.8 mol/L;

2) distillation of ethylene oxide: 10 g of calcium hydride was ground into powder, the powder was added into 100 ml of ethylene oxide and soaked for 24 h, and the ethylene oxide was distilled off at a normal temperature in a nitrogen atmosphere;

3) preparation of hydroxyl-terminated solution polymerized styrene-butadiene rubber: the temperature of a reactor was raised to 45° C., and the reactor was washed with cyclohexane for 2 h, wherein a mass ratio of butadiene to styrene was 100:30, a monomer mass fraction was 10%, a mass ratio of active lithium to (butadiene+styrene) was 1:90, a reaction temperature during butadiene-styrene rubber synthesis was 45° C., and the reaction time was 4 h; the reactor was cooled to a room temperature, and the ethylene oxide was added to serve as the end-capping reagent, wherein a mass ratio of the ethylene oxide to active lithium was 100:12, and the reaction time was 12 h; the rubber solution was collected in the nitrogen atmosphere, an appropriate amount of hydrochloric acid was added, the mixture was stirred at a normal temperature for 4 h, precipitation was performed with absolute ethanol to obtain the hydroxyl-terminated solution polymerized styrene-butadiene rubber (having a molecular weight of 1000 and a glass transition temperature of −28.1° C.), and the product was sealed and preserved;

4) preparation of a prepolymer: 15 g of hydroxyl-terminated solution polymerized styrene-butadiene rubber was stirred at 95° C. under vacuum condition (at a stirring rate of 200 rad/min) for 2 h, the temperature was lowered to 90° C., 5.7 g of 1,5-naphalene diisocyanate (NDI) was added, the mixture reacted for 3 h, the temperature was lowered to 65° C., sampling was performed, the mass content of —NCO was detected according to standard ASTM D2572-97, when the mass content of —NCO reached 5%, the product was discharged, sealed and preserved; and 5) preparation of solution polymerized styrene-butadiene rubber-polyurethane elastomer: 20 g of the prepolymer was stirred at 90° C. under vacuum condition (at a stirring rate of 200 rad/min) for 2 h, the temperature was lowered to 65° C., 1.16 g of 1,4-butanediol (BDO) and 0.2 g of trimethylolpropane (TMP) were added (at a dropping rate of 2 s/drop), the mixture was stirred at a high speed (at a stirring rate of 600 rad/min) for 2 min, cast molding was performed, the mold was placed in a drying oven at 100° C. for curing for 20 h, and the product was placed in a normal temperature for 7 d after being demoulded.

EXAMPLE 4

A preparation process of a polyurethane elastomer in the example comprises:

1) preparation of a dilithium initiator: cyclohexane and tetrahydrofuran were matched to serve as a solvent, and isoprene and lithium metal were reacted under an ice-water bath condition to produce the dilithium initiator; 55 g of a lithium sheet of which an oxide layer was stripped and 500 ml of tetrahydrofuran were added into a three-neck flask, then the three-neck flask was placed in the ice-water bath under argon shielding, and the temperature was stabilized at about 0° C.; 200 ml of isoprene and 500 ml of cyclohexane were uniformly mixed, the mixture was added into a pressure-equalizing dropping funnel and slowly added into the three-neck flask drop by drop, and fully reacted with the lithium metal; the mixture was continuously stirred at 0° C. for 6 h after dropping; the mixture was placed in a low temperature for 24 h after the reaction; and the upper clarified reaction solution was filtered by using a G4 sand core funnel to obtain a brownish red transparent initiator solution. Before use, the initiator concentration was calibrated by a double titration method. The concentration of the dilithium initiator was 0.8 mol/L;

2) distillation of ethylene oxide: 10 g of calcium hydride was ground into powder, the powder was added into 100 ml of ethylene oxide and soaked for 24 h, and the ethylene oxide was distilled off at a normal temperature in a nitrogen atmosphere;

3) preparation of hydroxyl-terminated solution polymerized styrene-butadiene rubber: the temperature of a reactor was raised to 50° C., and the reactor was washed with cyclohexane for 2 h, wherein a mass ratio of butadiene to styrene was 100:35, a monomer mass fraction was 10%, a mass ratio of active lithium to (butadiene+styrene) was 1:790, a reaction temperature during butadiene-styrene rubber synthesis was 55° C., and the reaction time was 4 h; the reactor was cooled to a room temperature, and the ethylene oxide was added to serve as the end-capping reagent, wherein a mass ratio of the ethylene oxide to active lithium was 100:20, and the reaction time was 12 h; the rubber solution was collected in the nitrogen atmosphere, an appropriate amount of hydrochloric acid was added, the mixture was stirred at a normal temperature for 4 h, precipitation was performed by using absolute ethanol to obtain the hydroxyl-terminated solution polymerized styrene-butadiene rubber (having a molecular weight of 8000 and a glass transition temperature of −28.3° C.), and the product was sealed and preserved;

4) preparation of a prepolymer: 15 g of hydroxyl-terminated solution polymerized styrene-butadiene rubber was stirred at 95° C. under vacuum condition (at a stirring rate of 250 rad/min) for 3 h, the temperature was lowered to 90° C., 2.3 g of 1,5-naphalene diisocyanate (NDI) was added, the mixture reacted for 3 h, the temperature was lowered to 65° C., sampling was performed, the mass content of —NCO was detected according to standard ASTM D2572-97, when the mass content of —NCO reached 5%, the product was discharged, sealed and preserved; and 5) preparation of solution polymerized styrene-butadiene rubber-polyurethane elastomer: 17.3 g of the prepolymer was stirred at 90° C. under vacuum condition (at a stirring rate of 250 rad/min) for 2 h, the temperature was lowered to 65° C., 0.7 g of 1,4-butanediol (BDO) and 0.13 g of trimethylolpropane (TMP) were added (at a dropping rate of 2 s/drop), the mixture was stirred at a high speed (at a stirring rate of 600 rad/min) for 2 min, cast molding was performed, the mold was put in a drying oven at 100° C. for curing for 20 h, and the product was placed in a normal temperature for 7 d after being demoulded.

Comparison Example 1

A preparation process of a polyurethane elastomer in the comparison example comprises:

1) preparation of a prepolymer: 16 g of polytetramethylene ether glycol (PTMG, having a molecular weight of 2000) was stirred at 80° C. under vacuum condition for 2.5 h, the temperature was lowered to 70° C., 6.6 g of 4,4-diphenylmethane diisocyanate (MDI) was added, the mixture reacted for 3 h, the temperature was lowered to 60° C., sampling was performed, the mass content of —NCO was detected according to standard ASTM D2572-97, the isocyanate was supplemented when the mass content of —NCO was less than 7%, and when the mass content of —NCO reached 7%, the product was discharged, sealed and preserved;

5) preparation of polyurethane elastomer: 22 g of the prepolymer was stirred at 80° C. under vacuum condition for 2 h, the temperature was lowered to 60° C., 2.8 g of 1,4-butanediol (BDO) and 0.5 g of trimethylolpropane (TMP) were added, the mixture was stirred at a high speed for 3 min, cast molding was performed, the mold was put in a drying oven at 100° C. for curing for 20 h, and the product was placed in a normal temperature for 7 d after being demoulded.

Data of the examples and the comparison example is seen in Table 1

TABLE 1

| | Glass transition temperature/ ° C. | Tensile strength/ MPa | Elongation at break/% | tensile stress at 100% elongation/ MPa | tensile stress at 300% elongation/ MPa | Hardness/ Shore A | Thermal decomposition temperature/ ° C. |
|---|---|---|---|---|---|---|---|
| Example 1 | −21.5 | 21.2 | 430 | 7.9 | 12.3 | 80 | 309 |
| Example 2 | −24.8 | 23.3 | 425 | 8.6 | 12.8 | 83 | 321 |
| Example 3 | −23.2 | 21.7 | 433 | 8.0 | 11.9 | 86 | 315 |
| Example 4 | −23.6 | 20.8 | 429 | 8.2 | 12.2 | 78 | 318 |
| Comparison example 1 | −52.8 | 20.2 | 438 | 8.1 | 11.9 | 74 | 295 |

Thermal decomposition of the polyurethane is generally performed in two stages, that is, firstly decomposition of the hard segment, and then decomposition of the soft segment. The data in the Table 1 shows that the polyurethane material of the present disclosure has obviously excellent thermal stability in comparison to the traditional polyurethane material in the Comparison example 1, and an initial thermal decomposition temperature is raised by 14-26° C. The tensile strength is improved by 0.6-3.1 MPa. Thanks to its adjustable hardness range, the polyurethane satisfies the using conditions of different tires.

Figure 1:
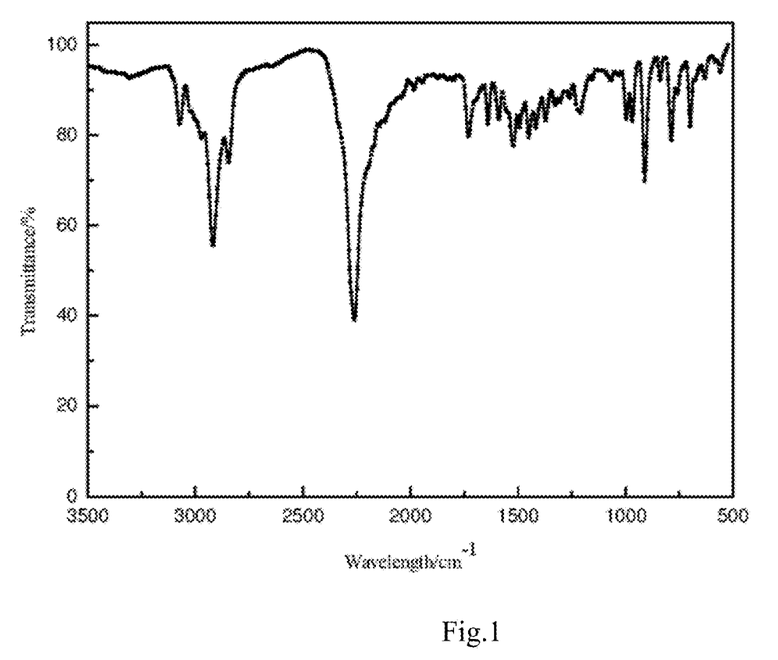
FIG. 1 is an infrared spectrogram of an example 2.
Figure 2:
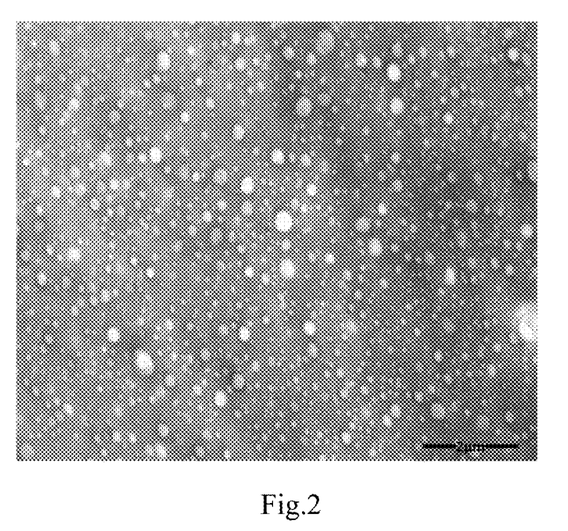
FIG. 2 is an SEM image of an example 2.
Figure 3:
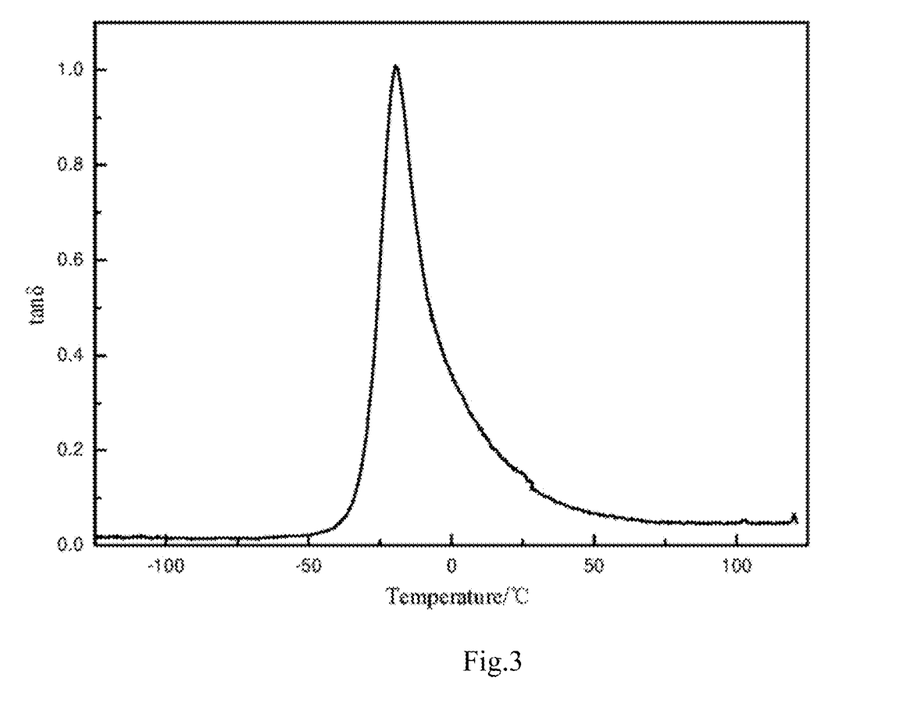
FIG. 3 is a DMA diagram of an example 2.
Figure 4:
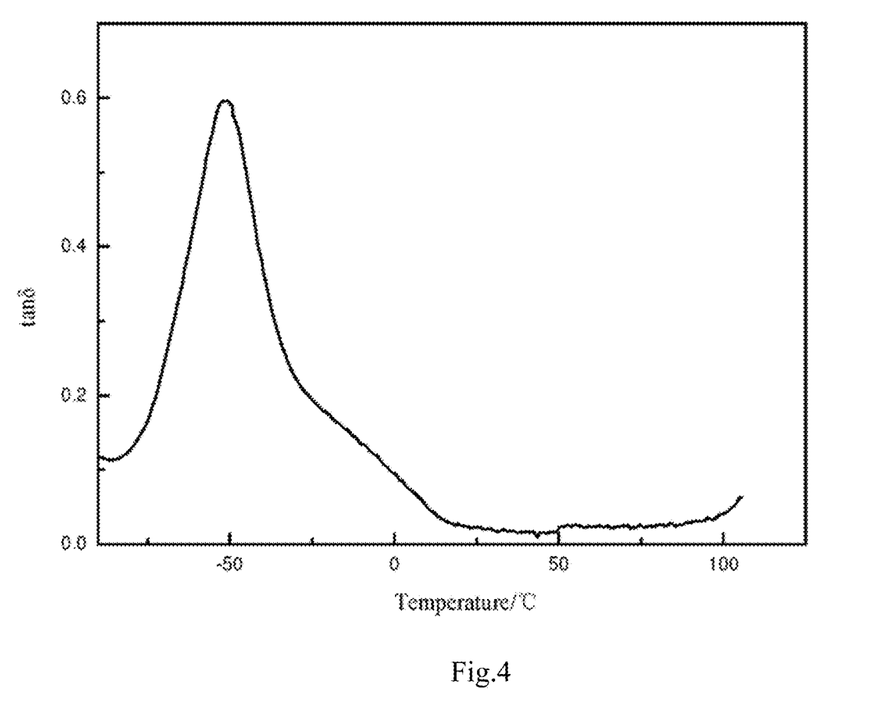
FIG. 4 is a DMA diagram of a Comparison example 1.

The polymer with a high loss factor (tan δ) at a lower temperature (about 0° C.) is capable of improving the wet-skid resistance of the product, and the polymer with low tan δ at a higher temperature (about 60° C.) is capable of reducing the rolling resistance of the product. The comparison of drawings 3 and 4 shows that the tan δ of the traditional polyurethane at 0° C. is 0.1, while the tan δ of the polyurethane of the present disclosure at 0° C. is 0.4, and the wet-skid resistance of the material is obviously improved. Meanwhile, at a temperature of 100° C., the tan δ of the traditional polyurethane is obviously increased, while the tan δ of the polyurethane of the present disclosure is still kept on an extremely low level, which further proves that the polyurethane of the present disclosure has more excellent heat resistance.

Obviously, the described examples are merely a part of the illustrations for clearly describing the present disclosure, rather than a limitation of the application modes of the present disclosure. On the basis of the description, those ordinarily skilled in the art may make other changes or modifications in different forms. All the examples cannot be listed herein. All obvious changes or modifications derived from the technical solution of the present disclosure are still included in a protection scope of the present disclosure.

The foregoing specific examples provide further detailed description to the objective, the technical proposals and the advantages of the present disclosure. It should be understood that the foregoing is only the specific examples of the present disclosure and not intended to limit the present disclosure. Any modification, equivalent replacement, improvement or the like made within the spirit and the principle of the present disclosure shall fall within the scope of protection of the present disclosure.

What is claimed is:

1. A solution polymerized styrene-butadiene rubber-polyurethane elastomer material for a high-performance tire, wherein the elastomer material comprises:
    a soft segment and a hard segment in a mass ratio of 100:(20-50);
    wherein the soft segment comprises hydroxyl-terminated solution polymerized styrene-butadiene rubber moiety prepared by an anionic polymerization;
    wherein the hard segment comprises a moiety of a reaction product of a mixture comprising an isocyanate, a small-molecule polyol chain extender, and a cross-linking agent;
    wherein the isocyanate comprises 4,4-diphenylmethane diisocyanate, 1,5-naphalene diisocyanate, or toluene-2, 4-diisocyanate;
    wherein the small-molecule polyol chain extender comprises 1,4-butanediol or ethylene glycol;
    wherein the cross-linking agent comprises trimethylolpropane or glycerin;
    wherein a mass ratio of the soft segment to the isocyanate is 100:(15-45); a mass ratio of (the soft segment+the isocyanate) to (the chain extender+the cross-linking agent) is 100:(4-12); a mass ratio of the chain extender to the cross-linking agent is 100:(17-100);
    a molecular weight of the soft segment is 1000-8000; and
    a glass-transition temperature of the soft segment is −20° C. to −30° C.; and
    wherein the soft segment is prepared by a method comprising the following steps:
    (1) preparation of a dilithium initiator, namely taking cyclohexane and tetrahydrofuran as solvents, and reacting isoprene and lithium metal under an ice-water bath condition to produce the dilithium initiator;
    (2) distillation and purification of ethylene oxide; and
    (3) performing a synthetic reaction on butadiene, styrene and the dilithium initiator at a reaction temperature of 45-55° C. for 3.5-4.5 h, cooling a reactor to a room temperature, adding ethylene oxide serving as an end-capping reagent, and reacting for 12-14 h to produce hydroxyl-terminated solution polymerized styrene-butadiene rubber;

wherein, a mass ratio of butadiene to styrene is 100:(25-35); a mass ratio of ethylene oxide to active lithium is 100:(10-20); and a mass ratio of the active lithium to (butadiene+styrene) is 1:(90-790).

2. The solution polymerized styrene-butadiene rubber-polyurethane elastomer material of claim 1, wherein the mass ratio of the soft segment to the hard segment is 100:(30-45).

3. The solution polymerized styrene-butadiene rubber-polyurethane elastomer material of claim 1, wherein the soft segment has a molecular weight of 4500-6500.

4. The solution polymerized styrene-butadiene rubber-polyurethane elastomer material of claim 1, wherein the dilithium initiator has a concentration of 0.5-1.0 mol/L.

5. The solution polymerized styrene-butadiene rubber-polyurethane elastomer material of claim 1, wherein the solution polymerized styrene-butadiene rubber-polyurethane elastomer has a glass-transition temperature of $-20°$ C. to $-30°$ C.

6. A solution polymerized styrene-butadiene rubber-polyurethane elastomer material for a high-performance tire, wherein the elastomer material comprises:

a soft segment and a hard segment in a mass ratio of 100:(20-50), wherein the soft segment comprises hydroxyl-terminated solution polymerized styrene-butadiene rubber moiety prepared by an anionic polymerization; and the hard segment comprises a moiety of a reaction product of a mixture comprising an isocyanate, a small-molecule polyol chain extender, and a cross-linking agent, wherein the isocyanate comprises 4,4-diphenylmethane diisocyanate, 1,5-naphalene diisocyanate, or toluene-2,4-diisocyanate;

the small-molecule polyol chain extender comprises 1,4-butanediol or ethylene glycol; and the cross-linking agent comprises trimethylolpropane or glycerin;

wherein a mass ratio of the soft segment to the isocyanate is 100:(15-45);

a mass ratio of (the soft segment+the isocyanate) to (the chain extender+the cross-linking agent) is 100:(4-12);

a mass ratio of the chain extender to the cross-linking agent is 100:(17-100);

a molecular weight of the soft segment is 1000-8000; and a glass-transition temperature of the soft segment is $-20°$ C. to $-30°$ C.

7. The elastomer material of claim 6, wherein the mass ratio of the soft segment to the hard segment is 100:(30-45).

8. The elastomer material of claim 6, wherein the soft segment has a molecular weight of 4500-6500.

9. The elastomer material of claim 6, wherein the elastomer material has a glass-transition temperature of $-20°$ C. to $-30°$ C.

10. The elastomer material of claim 6, wherein the cross-linking agent comprises trimethylolpropane.

11. The elastomer material of claim 6, wherein the soft segment is prepared by a method comprising the following steps:

a) preparing a dilithium initiator by reacting isoprene and lithium metal;

b) providing purified ethylene oxide; and c) performing a synthetic reaction with butadiene, styrene and the dilithium initiator at a reaction temperature of 45-55° C. for 3.5-4.5 h, cooling the reaction mixture to room temperature, adding ethylene oxide serving as an end-capping reagent, and reacting for 12-14 h to provide the hydroxyl-terminated solution polymerized styrene-butadiene rubber;

wherein, a mass ratio of butadiene to styrene is 100:(25-35);

a mass ratio of ethylene oxide to active lithium is 100:(10-20); and a mass ratio of active lithium to (butadiene+styrene) is 1:(90-790).

12. The elastomer material of claim 11, wherein the dilithium initiator has a concentration of 0.5-1.0 mol/L.

13. The elastomer material of claim 11, wherein the elastomer material has a decomposition temperature of at least 309° C.

14. The elastomer material of claim 11, wherein the elastomer material has a loss factor of at least 0.4 at a temperature of 0° C.

15. A method of preparing the elastomer material of claim 6, wherein the method comprises:

a) preparing a prepolymer by reacting the hydroxyl-terminated solution polymerized styrene-butadiene rubber with the isocyanate, and discharging the prepolymer when the mass content of —NCO is 5%-11%; and b) preparing the elastomer material by firstly stirring the prepolymer at 80-90° C. under the vacuum condition for 2-3 h, and then cooling to 65-75° C., and secondly adding the small-molecule polyol chain extender and the cross-linking agent, and stirring at a high speed for 2-3 min, and performing cast molding to provide the polyurethane elastomer material.

16. The method of claim 15, wherein a stirring rate for stirring the prepolymer is 150-250 rad/min, a high speed rate for 2-3 min is 400-600 rad/min, and the small-molecule polyol chain extender and the cross-linking agent are added at a dropping speed of 1-2 s/drop.

17. The method of claim 15, wherein preparing the prepolymer comprises:

stirring hydroxyl-terminated solution polymerized styrene-butadiene rubber at 90-100° C. under a vacuum condition for 2-3 h, cooling to 80-90° C., adding isocyanate, reacting for 2.5-3 h, cooling to 65-75° C., sampling, detecting a mass content of —NCO, supplementing the isocyanate when the mass content of —NCO is less than 5%-11%, and discharging when the mass content of —NCO is 5%-11%.

* * * * *